United States Patent
Shukla

(10) Patent No.: US 11,497,988 B2
(45) Date of Patent: Nov. 15, 2022

(54) EVENT CATEGORIZATION AND KEY PROSPECT IDENTIFICATION FROM STORYLINES

(71) Applicant: Omniscience Corporation, Sunnyvale, CA (US)

(72) Inventor: Manu Shukla, Sterling, VA (US)

(73) Assignee: OMNISCIENCE CORPORATION, Sunnyvale, CA (US)

( * ) Notice: Subject to any disclaimer, the term of this patent is extended or adjusted under 35 U.S.C. 154(b) by 989 days.

(21) Appl. No.: 15/253,008

(22) Filed: Aug. 31, 2016

(65) Prior Publication Data
US 2017/0056764 A1    Mar. 2, 2017

Related U.S. Application Data

(60) Provisional application No. 62/212,442, filed on Aug. 31, 2015.

(51) Int. Cl.
*G06N 20/00* (2019.01)
*A63F 13/25* (2014.01)
(Continued)

(52) U.S. Cl.
CPC ............ *A63F 13/25* (2014.09); *G06N 20/00* (2019.01); *G06N 20/10* (2019.01); *H04L 51/222* (2022.05); *H04L 51/52* (2022.05); *H04L 67/131* (2022.05); *H04L 67/535* (2022.05); *A63F 2300/8082* (2013.01)

(58) Field of Classification Search
None
See application file for complete search history.

(56) References Cited

U.S. PATENT DOCUMENTS

| 7,047,489 B2 | 5/2006 | Kanno et al. |
| 7,644,052 B1 | 1/2010 | Chang et al. |

(Continued)

FOREIGN PATENT DOCUMENTS

| WO | WO-2017040632 A2 | 3/2017 |
| WO | WO-2017040632 A3 | 3/2017 |

OTHER PUBLICATIONS

"U.S. Appl. No. 15/092,020, Non Final Office Action dated Apr. 19, 2018", 22 pgs.

(Continued)

*Primary Examiner* — Casey R. Garner
(74) *Attorney, Agent, or Firm* — Womble Bond Dickinson (US) LLP

(57) ABSTRACT

Aspects of the subject technology include an event processing and prospect identifying platform. It accepts as input a set of storylines (a sequence of entities and their relationships) and processes them as follows: (1) uses different algorithms (LDA, SVM, information gain, rule sets) to identify themes from storylines; (2) identifies top locations and times in storylines and combines with themes to generate events that are meaningful in a specific scenario for categorizing storylines; and (3) extracts top prospects as people and organizations from data elements contained in storylines. The output comprises sets of events in different categories and storylines under them along with top prospects identified. Aspects use in-memory distributed processing that scales to high data volumes and categorizes generated storylines in near real-time.

18 Claims, 7 Drawing Sheets

(51) Int. Cl.
*G06N 20/10* (2019.01)
*H04L 51/52* (2022.01)
*H04L 51/222* (2022.01)
*H04L 67/131* (2022.01)
*H04L 67/50* (2022.01)

(56) References Cited

U.S. PATENT DOCUMENTS

| | | |
|---|---|---|
| 2003/0058268 A1 | 3/2003 | Loui et al. |
| 2010/0145678 A1 | 6/2010 | Csomai et al. |
| 2010/0299364 A1 | 11/2010 | Baldwin et al. |
| 2011/0099133 A1* | 4/2011 | Chang .................. G06F 16/353 706/12 |
| 2011/0270889 A1 | 11/2011 | Stevens et al. |
| 2012/0042022 A1 | 2/2012 | Sheth et al. |
| 2013/0086072 A1 | 4/2013 | Peng et al. |
| 2014/0195544 A1 | 7/2014 | Whitman |
| 2014/0201244 A1 | 7/2014 | Zhou |
| 2015/0168162 A1 | 6/2015 | Subramanian et al. |
| 2015/0186497 A1 | 7/2015 | Patton et al. |
| 2015/0363402 A1 | 12/2015 | Jackson et al. |
| 2016/0188590 A1* | 6/2016 | Cole .................. G06F 16/9537 707/747 |
| 2016/0292151 A1 | 10/2016 | Shukla |
| 2017/0300582 A1* | 10/2017 | King ...................... G06Q 10/10 |

OTHER PUBLICATIONS

"International Application Serial No. PCT US2016 049662, International Preliminary Report on Patentability dated Mar. 22, 2018", 9 pgs.

"U.S. Appl. No. 15/092,020, Examiner Interview Summary dated Jun. 22, 2017", 2 pgs.

"U.S. Appl. No. 15/092,020, Non Final Office Action dated Jun. 2, 2017", 17 pgs.

"U.S. Appl. No. 15/092,020, Response filed Jul. 3, 2017 to Non Final Office Action dated Jun. 2, 2017", 16 pgs.

"U.S. Appl. No. 15/092,020, Response filed Jan. 30, 2018 to Final Office Action dated Nov. 30, 2017", 17 pgs.

"U.S. Appl. No. 15/092,020, Final Office Action dated Nov. 30, 2017", 19 pgs.

"Information Cartography (Multiple Contributed Articles)", Communications of the ACM, 58(11), (Nov. 2015), 61-73.

"International Application Serial No. PCT/US2016/049662, International Search Report dated Feb. 28, 2017", 3 pgs.

"International Application Serial No. PCT/US2016/049662, Written Opinion dated Feb. 28, 2017", 7 pgs.

"LingPipe: Part-of-Speech Tutorial", Alias, [Online], Retrieved from the Internet: <URL: http://alias-i.com/lingpipe/demos/tutorial/posTags/read-me.html>, (Accessed: Mar. 7, 2016), 11 pgs.

"PageRank", Wikipedia, [Online], [Archived Mar. 7, 2016]. Retrieved from the Internet: <URL: https://en.wikipedia.org/wiki/PageRank>, (Accessed: Mar. 7, 2015), 19 pgs.

Austin, David, "How Google Finds Your Needle in the Web's Haystack", Feature Column from the AMS, [Online], Retrieved from the Internet: <URL: http://www.ams.org/samplings/featurecolumn/fcarcpagerank>, (Accesed: Mar. 7, 2016), 7 pgs.

Dos Santos, Ray, et al., "Spatio-Temporal Storytelling on Twitter", ACM Transactions on Intelligent Systems and Technology, X(X), ZZ:01-ZZ:31.

U.S. Appl. No. 15/092,020, filed Apr. 6, 2016, Distributed Storytelling Framework for Intelligence Analysis.

* cited by examiner

EVENT CATEGORIZATION AND KEY PROSPECT IDENTIFICATION FROM STORYLINES

PRIORITY CLAIM

This application claims priority to U.S. Provisional Patent Application No. 62/212,442, filed on Aug. 31, 2015, and titled "DISTRIBUTED IN-MEMORY SPATIO-TEMPORAL EVENT-BASED STORYLINE CATEGORIZATION PLATFORM IN SOCIAL MEDIA," which is incorporated herein by reference in its entirety.

RELATED APPLICATIONS

This application is related to U.S. patent application Ser. No. 15/092,020, filed on Apr. 6, 2016, and titled "DISTRIBUTED STORYTELLING FRAMEWORK FOR INTELLIGENCE ANALYSIS," which is incorporated herein by reference in its entirety. This application is related to U.S. Provisional Patent Application No. 62/143,540, filed on Apr. 6, 2015, and titled "DISTRIBUTED STORYTELLING FRAMEWORK FOR INTELLIGENCE ANALYSIS," which is incorporated herein by reference in its entirety.

TECHNICAL FIELD

The subject matter disclosed herein relates to machine learning and information processing. In particular, example embodiments may relate to event categorization and key prospect identification from storylines.

BACKGROUND

Every day, users enter text into publicly accessible social networking or microblogging services describing their activities. This text provides information about ongoing or recent events, some of which may be interesting from various perspectives, such as news reporting or gathering intelligence. Gathering and analyzing intelligence from publicly accessible social networking or microblogging services presents a number of technical challenges.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
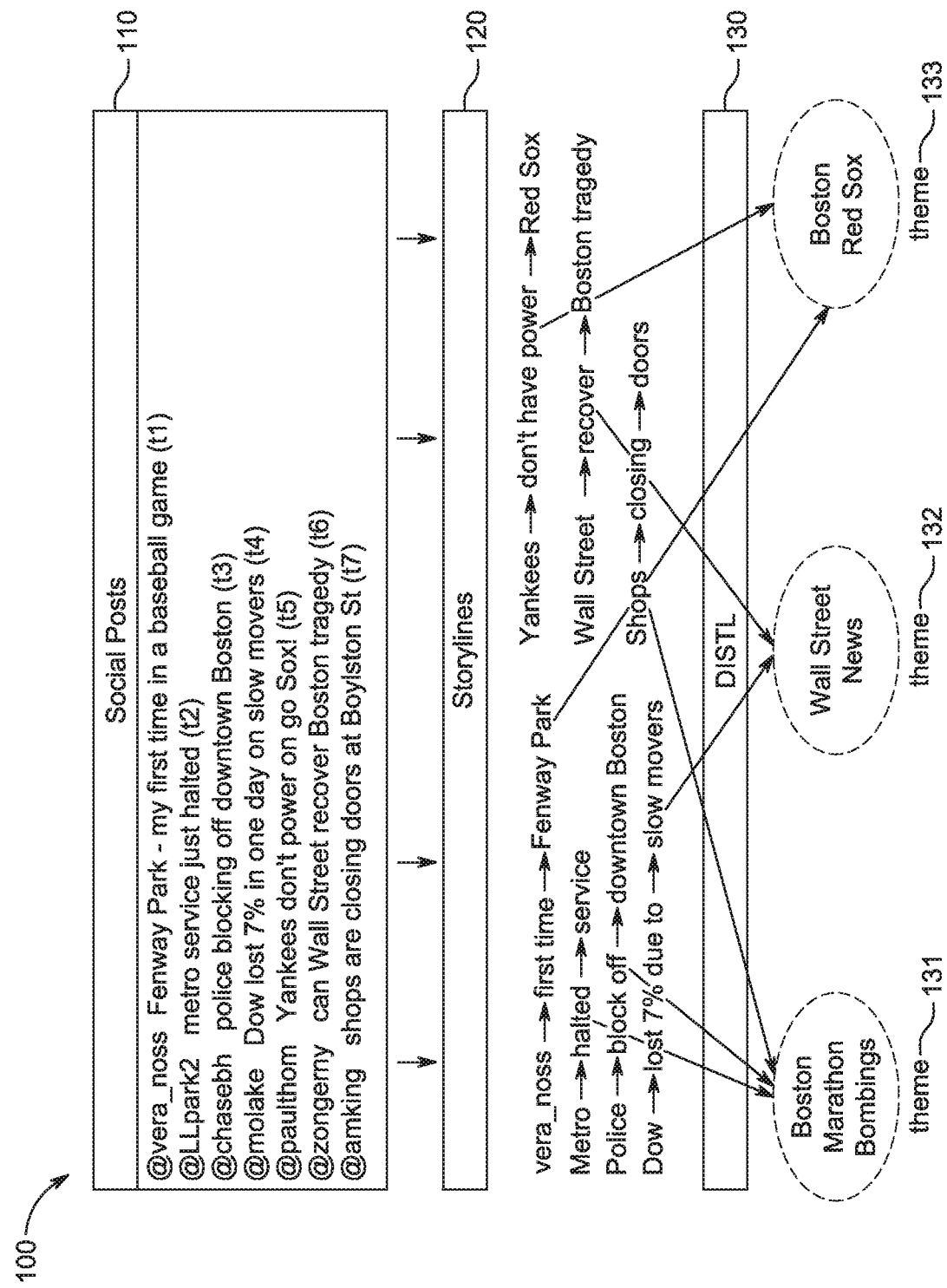
FIG. 1 illustrates an example flow of events used to categorize storylines, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As discussed above, every day, users enter much information into social networking or microblogging services. This information may, potentially, be used to gather and analyze intelligence. However, as noted above, gathering and analyzing intelligence from publicly accessible social networking or microblogging services presents a number of technical challenges.

As used herein, the term "social post" refer to a post made in a social networking or a microblogging service, for example, a Tweet® in Twitter® or a post in Facebook®, LinkedIn®, Google Plus®, or a similar service. A social post may be publicly accessible, with no limits on access created by the author of the post, or privately accessible, with limited on access created by the author of the post. For example, for a privately accessible social post, an author may limit access to his/her social contacts or "friends" within the social networking service hosting the social post.

According to some implementations of the subject technology, a server accesses publicly accessible social posts from one or more social networking or microblogging services and converts these social posts into storylines. The server converts each social post into a storyline by determining a time, a geographic location, and a theme for the social post. As used herein, a storyline is a description of a social post that includes a time, a geographic location, and a theme (e.g., text or any other non-time or non-geographic description of the social post). Storylines are described in greater detail, for example, in conjunction with FIGS. 1-2, below.

The server accesses the storylines generated from the social posts. The server identifies multiple events, where each event is associated with one or more of an event time, an event geographic location, and an event theme. Examples of events include the Boston Marathon Bombing in Boston, Mass. on Apr. 15, 2013 (which has an event time, an event geographic location, and an event theme), and oil prices in January 2016 (which has an event time and an event theme, but no event geographic location). More detailed examples of events are described in conjunction with FIG. 1, below. The server associates storyline(s) with event(s) based on a correspondence between the time, geographic location or theme of the storyline(s) with the event time, event geographic location, and event theme of the event(s). For at least one event, the server identifies one or more prospects that are mentioned at least a threshold number (e.g., 10 or 100) of times in storyline(s) associated with the event. The one or more prospects include person(s) or organization(s) related to the event.

According to some embodiments, the server pulls in training and test (e.g., new incoming) storylines. The server generates integer indexes for both the test storylines and the training storylines. These integer indexes represent the set of terms from training data by which the test data terms are filtered. The server applies three techniques—classification, topic modeling, and feature selection—to the storylines. The classification technique includes using the training storylines to build a support vector machine (SVM) model and scoring new storylines against the SVM model. The topic modeling technique includes applying Latent Dirichlet allocation (LDA) for topic/theme modeling and scoring storylines by topic/theme based on storyline entities weights for the topic/theme. The feature selection technique includes using training data to perform feature selection based on information gain and scoring storylines by adding up the information gain weights of entities (e.g., text from the social post) within the storylines. Feature selection ranks the top terms in the training data that determine the label by information gain values which measure the strength of a variable in predicting a label based on their presence or absence in a document.

For each of the three techniques above—classification, topic modeling, and feature selection—the server extracts top scoring storylines determined by analyst (e.g., human analyst or machine analyst) specified thresholds. For events, the server extracts geographic location, theme, and time elements from top scoring storylines; generates events from top themes, geographic location, and time elements; and categorizes storylines under events by applying user-provided rules. For prospects, the server identifies data elements of top scoring storylines; extracts prospects (person(s) or organization(s)) from the data elements, and identifies the top prospects.

Event analysis and prospect identification in social media is challenging due to endless amount of information generated daily. While current research focuses on detecting events, there is no clear guidance on how those events should be processed such that they are meaningful to a human analyst. There are no clear ways to detect prospects from social media either. Aspects of the subject technology are related to DISTL (Distributed In-memory Spatio-Temporal story Line categorization platform), an event processing and prospect identifying platform. It accepts as input a set of storylines (a sequence of entities and their relationships) and processes them as follows: (1) uses different algorithms (e.g., Latent Dirichlet allocation (LDA), support vector machine (SVM), information gain, and rule sets) to identify themes from storylines; (2) identifies top locations and times in storylines and combines with themes to generate events that are meaningful in a specific scenario for categorizing storylines; and (3) extracts top prospects as people and organizations from data elements contained in storylines. The output comprises sets of events in different categories and storylines under them along with top prospects identified. Aspects of the subject technology use in-memory distributed processing that scales to high data volumes and categorizes generated storylines in near real-time.

Figure 2:
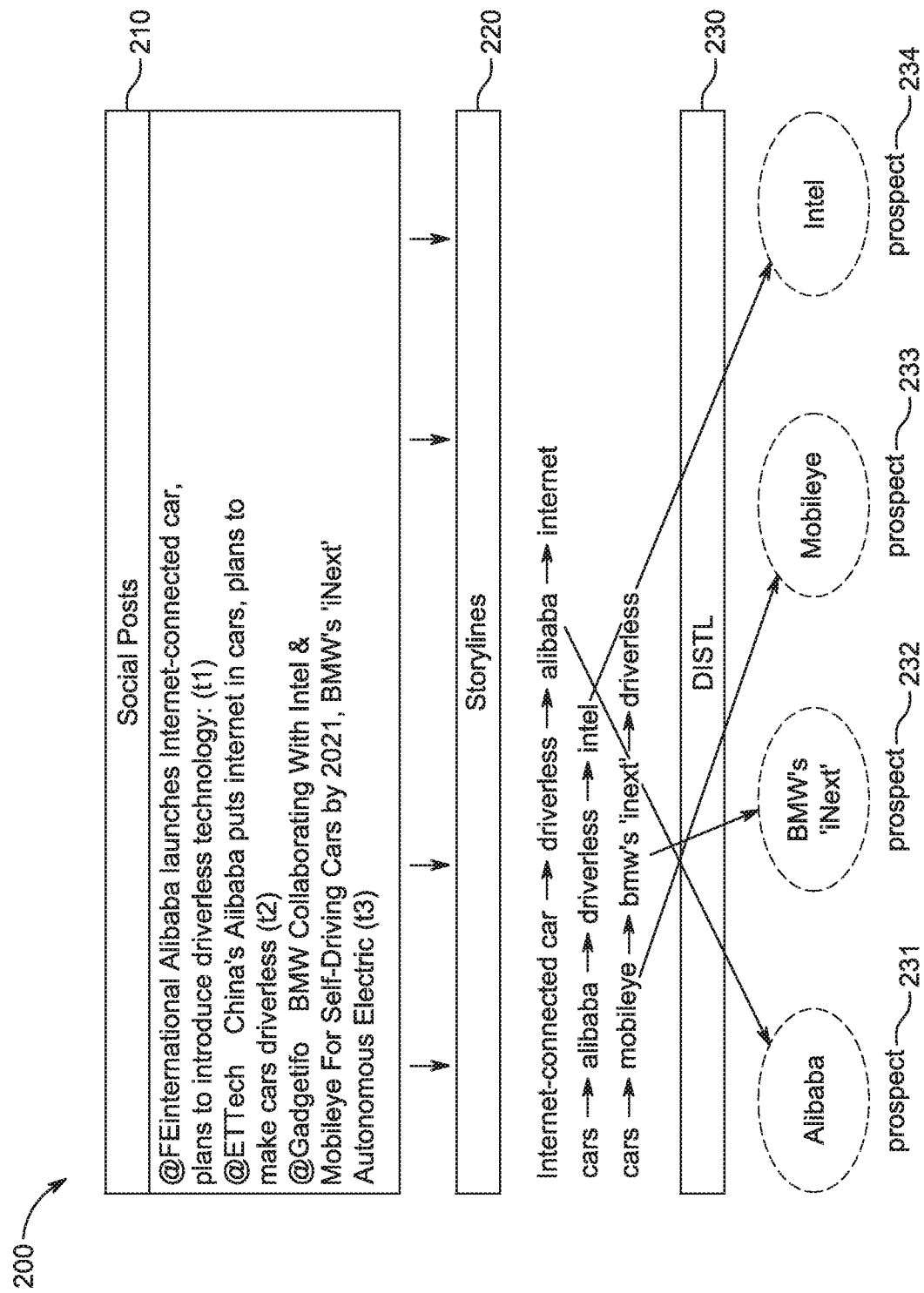
FIG. 2 illustrates an example flow of prospects from social posts used to build storylines, according to some embodiments.

In social networking or microblogging services (e.g., Twitter®), emerging events propagate at a much faster pace than in traditional news. Combining relevant facts together (while discarding unimportant ones) can be very challenging because the amount of available data is often much larger than the amount of processing power. This implies that many systems are unable to keep up with increasingly large volumes of data, which may cause important information to be missed. In some cases, event processing includes two tasks: (1) collecting all the facts, entities, and their relationships; and (2) grouping them by their themes of discussion, space, and timeframes. These two tasks may be performed in a distributed paradigm for maximum coverage. In the real world, not every piece of information is thoroughly investigated in a timely manner. In some cases, the two previous tasks may be minimized (e.g., in terms of time or computational resource usage) so that an event can be described with the most number of pertinent facts that yields the most complete picture. FIG. 1 provides a visual representation 100 of the idea. FIG. 1 shows seven social posts 110 (e.g., Tweets® in Twitter®) with a connection to the Boston area. The social posts t2, t3, and t7 are related to the Boston Marathon Bombings of April 2013, while t1 and t5 are about baseball, and t4 and t6 are about finance. In some implementations, these social posts may be provided along with millions of other social posts of different natures. Further, they relate to different topics, which indicates they may be presented separately. As seen in FIG. 1, all of the social post 110 are first transformed into simple storylines 120, and then grouped into three different themes by DISTL 130 ("Boston Marathon Bombings" 131, "Wall Street News" 132, and "Boston Red Sox" 133), which may be better suited to present to different audiences. Social media is also one possible venue to identify emerging prospects for investment, partnerships and acquisitions. For key prospect identification, finding top people and organizations from storylines model or performing unsupervised learning may be useful. FIG. 2 provides a visual representation 200 of the idea. The figure shows three social posts 210 (t1, t2, and t3) related to connected cars, self-driving cars and industry activity. As the example of FIG. 2 shows, all of the social posts 210 are first transformed into simple storylines 220, and then four different prospects are identified by DISTL 230, three prospects represent large companies (Alibaba 231, BMW 232, and Intel 234) and one (Mobileye 233) is a small company. The latter may be of particular interest to an analyst looking to invest in smaller companies in the connected car business, while the other three may be better suited for an analyst tracking large investments in the area.

Aspects of the subject technology may be implemented as a system that ingests storylines derived from social posts, and allocates the storylines to events. Techniques for generating storylines from social posts are described, for example, in U.S. patent application Ser. No. 15/092,020, filed on Apr. 6, 2016, and titled "DISTRIBUTED STORYTELLING FRAMEWORK FOR INTELLIGENCE ANALYSIS," which is incorporated herein by reference in its entirety. In some implementations, a server implementing aspects of the subject technology finds top prospects for investments and acquisition in a given domain. The criteria used for the allocation process is that storylines have common themes, are geographically located in nearby areas, and take place during close timeframes. Aspects of the subject technology use as input the storylines generated from social posts by other technologies, and is an in-memory spatio-temporal event processing platform that can scale to large amounts of storylines using Big Data techniques. The platform helps analysts find faint, yet crucial events by separating storylines into groups, which allow analysts to sift through them in subsets under specific contexts.

A storyline may include a time-ordered connection of facts that take place in a geographical area. As shown in FIG. 1, for example, "police→block off→downtown Boston" represents a storyline 120 related to a bigger event (the Boston Marathon Bombings 131). Storylines may be variable in length, and made as elastic as desired.

In order for a storyline "to be told", the user selects a starting entity, such as a person or organization, from where the story can investigated. By checking the connections from that starting entity to other entities, one can then combine the facts together into a bigger event. For example, one may select a "person carrying a back pack" from one social post to be the starting entity, and obtain other facts from other social posts, such as "entering subway", and "making a phone call", which would paint a more complete picture of a possible crime. In some aspects, a distributed system that mines storylines (e.g., as described in U.S. patent application Ser. No. 15/092,020, filed on Apr. 6, 2016, and titled "DISTRIBUTED STORYTELLING FRAMEWORK FOR INTELLIGENCE ANALYSIS," which is incorporated herein by reference in its entirety) is provided. It is effective in extracting storylines from both short unstructured social posts and structured events such as in GDELT (Global Databases of Events, Language and Tone). In some implementations, a MapReduce function is used to generate all storylines from a specified starting entity from a large set of social posts. Since MapReduce is disk-based, it may become less than ideal for the highly-iterative event processing algorithms used in some aspects of the subject technology. For that reason, memory-based solutions may be considered.

One aspect of the subject technology is a framework to generate spatio-temporal events and investment prospects from storylines. Multiple algorithms (e.g., LDA, Information gain, classification) are applied to determine events that incorporate themes, location and time elements. The framework also identifies prospects for investment, partnership or acquisition for a domain.

One aspect of the subject technology distributes in-memory event processing and prospect identification. In-memory distributed architecture scales highly iterative event and prospect generation. This allows for processing large number of storylines efficiently.

One aspect of the subject technology is directed to developing rules based technique to categorize storylines into events. Rules allow user fine-grained control on incorporating storylines into events. This provides user flexibility in focusing on theme, location or time.

One aspect of the subject technology includes conducting experiments to validate events categorization and top prospects identification from storylines. Framework and algorithms are validated with extensive experiments in multiple domains. Aspects of the subject technology categorize storylines under meaningful events and find useful prospects for investigation.

Event creation in social media is a widely researched field. Event creation consists of identifying the event and characterizing it. Events may be detected from social media, news articles, and the like. In some cases, an event may be created by a user based on a topic that the user wishes to research. For example, a user researching oil prices in January 2016 may create a corresponding event.

Aspects of the subject technology provide techniques for distributed event creation. Aspects apply highly iterative techniques to event theme generation that can not be scaled efficiently with disk based distribution (e.g., MapReduce). Use of a cluster computing framework (e.g., Apache Spark®) to perform topic modeling, entity selection and classification in memory allows for much more efficient scaling. The cluster computing framework distributes the entire sequence of steps starting from composite event generation and subsequent storyline categorization into those events in-memory. This allows aspects of the subject technology to scale the process completely and maximize impact of distribution.

Techniques used to generate events from storylines and categorize storylines under those events are described herein. Some distribution techniques are available in the cluster computing framework Apache Spark®. Aspects of the subject technology also include theme generation techniques and techniques for generating events from themes and storylines assigned to the events. Aspects of the subject technology are also directed to top prospect identification techniques.

Apache Spark® (hereinafter "Spark") is an in-memory distribution framework that allows computations to be distributed over a large number of nodes in a cluster. The programming constructs available in Spark represent transformation of data on disk into RDDs (Resilient Distributed Datasets), which reside in-memory. Operations applied on the RDDs to generate values that can be returned to the application. RDDs provide fault tolerance in case one or more nodes of the cluster fail. The algorithms typically useful for Spark are the ML (Machine Learning) and statistical functions that are highly iterative in nature. Performing highly distributed operation in any other distributed construct such as MapReduce is computationally expensive due to data written to disk in each iteration. Spark allows for highly efficient iterative operations as they are all performed in memory.

The main operations provided by Spark that allows it process large volumes of data in parallel can be broadly categorized into actions and transforms. The transform operations commonly used include map, filter, flatMap, join, reduceByKey, and sort. The action operations commonly used are reduce, collect, and count. The map operation returns a distributed dataset by applying a user specified function to each element of a distributed dataset. A flatMap does the same except one input term can be mapped to multiple output items. The reduceByKey operation aggregates the values of each key in key-value pairs <K,V> according to provided reduce function. The filter operation returns datasets from source for which given function evaluates true. Spark also allows the machine to keep a read-only value of variables in cache on each node instead of shipping them with each task through broadcast variables.

Aspects include theme creation. Several major theme recognition techniques may be implemented. The event creation technique uses top-weighted keywords as themes. A dictionary-based method assigns storylines to event buckets. Rule based storylines categorization is performed. Aspects include generating events based on theme, geographic location, and time. The dictionary is generated for themes by analyzing the terms of the storylines and discovering key ones. The recognized themes are then used to categorize the storylines.

Figure 3:
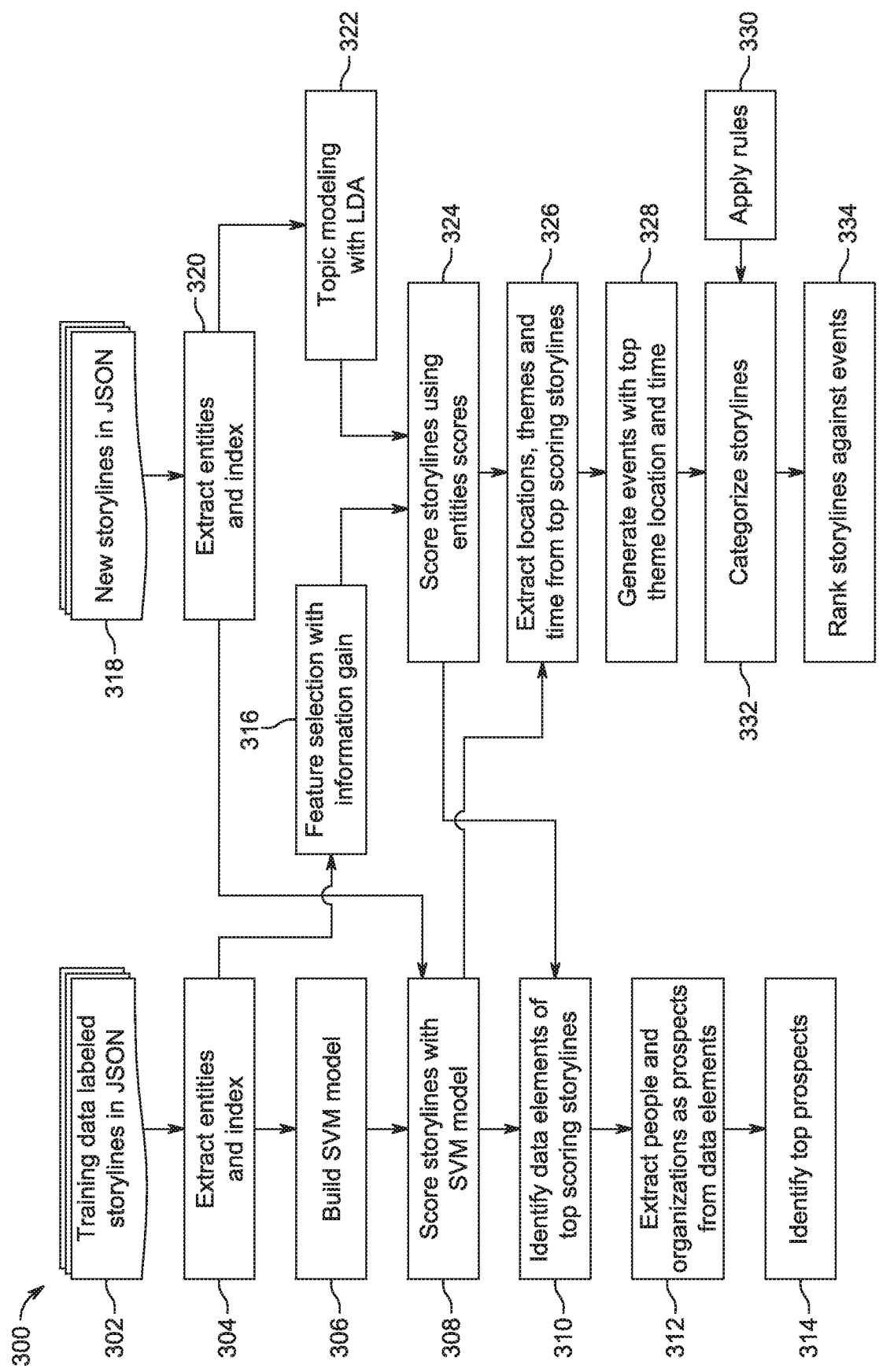
FIG. 3 is a flow chart of an example operation of a distributed in-memory spatio-temporal storyline categorization platform, according to some embodiments.

The key aspect of event generation is identifying the entities that are closest to significant events. The sequence of steps in events generation and assigning storylines to events is shown in FIG. 3, described in greater detail below. The flow consists of three main steps: process storylines, build themes and create events, and score and categorize storylines. The first step processes storylines and identifies spatial and temporal entities in them. Here, supervised and unsupervised techniques are used in the identification of the most critical entities, which are used in the subsequent step. Theme, spatial and temporal entities are combined to generate events. The storylines are then categorized under the events in the last step of flow. The three algorithms used in second step of flow are described below.

Topic Modeling based event creation: Topic models are generated using Latent Dirichlet Allocation (LDA). It uses a list of storylines as input data, where each storyline represents a document. This technique outputs a number of topics specified by the user, where each topic is comprised as a set of keywords.

Feature Selection through Information Gain based event creation: This technique extracts top n keywords by information gain from storylines. Each storyline is treated as a document. Each of the highest n (where n is a predetermined number, e.g., 10 or 20) information gain value keywords is treated as belonging to the subject for which labeled data was generated.

Classifier based event creation: This technique uses a classifier trained with user generated set of storylines for a particular subject. This model is then used to classify storylines into ones belonging to that subject or not. An example would be if analyst wants to separate storylines that are related to earnings of a company from storylines that are not. A classifier based technique works best in case of known subjects being analyzed in storylines. Events under which storylines are categorized are generated using most frequent theme, location and time entities in positively labeled training data. Storylines are also scored based on the classifier score or the score of their entities for topic or feature selection. These scores are then used to filter top storylines by applying a threshold. Data elements for entities of top storyline are then identified and used to create top people and organizations as prospects.

Topic modeling falls under unsupervised learning while other two machine learning techniques (information gain and classifier) are supervised. They require training data in order to generate the themes. All these techniques are highly iterative and under large datasets computationally expensive especially in terms of building model. Algorithm 1 (in the Algorithm Appendix) shows the application of 3 techniques to categorize events. Operation 1 performs the extraction of entities from storylines and generating RDDs of storylines from JSON output produced by techniques disclosed in U.S. patent application Ser. No. 15/092,020, filed on Apr. 6, 2016, and titled "DISTRIBUTED STORYTELLING FRAMEWORK FOR INTELLIGENCE ANALYSIS," which is incorporated herein by reference in its entirety. One RDD is created for training data and one from scoring data. A combined index of entities is generated. Operation 2 then generates RDDs of theme entities and other entities identified as location and time as PairRDDs. PairRDDs are <Key, Value> pair representation in RDDs. The algorithm then performs LDA based topic modeling, feature selection based on information gain or SVM model generation and most frequent entities from positively labeled training data to extract themes from entities. All operations are implemented such that they are performed in memory. The algorithms may be encoded in software (e.g., instructions stored in memory), hardware (e.g., hard-wired into a processor or memory), or a combination of software and hardware.

FIG. 3 is a flow chart of an example method 300 of operation of a distributed in-memory spatio-temporal storyline categorization platform, according to some embodiments. The method 300 may begin at either block 302 or block 318.

At block 302, training data labeled storylines in JSON (JavaScript Object Notation) are provided to a server. At block 304, entities are extracted from the storylines, and the entities are indexed by the server. After block 304, the method 300 continues to either block 306 or block 316.

At block 306, the server builds a SVM model. At block 308, the server scores storylines with the SVM model. After block 308, the method 300 continues to either block 310 or block 326.

At block 310, the server identifies data elements of top scoring storylines. At block 312, the server extracts people and organizations as prospects from the data elements. At block 314, the server identifies top prospects. After block 314, the method 300 ends.

Alternatively, after block 304, the method 300 continues to block 316, where the server applies feature selection with information gain to the storylines. After block 316, the method 300 continues to block 324, described below.

In another alternative, the method 300 begins at block 318. At block 318, the server accesses new storylines in JSON. At block 320, the server extracts entities from the new storylines and indexes the entities. After block 320, the method 300 continues to either block 308, as described above, or block 322.

At block 322, the server applies topic modeling with LDA to the storylines. At block 324, the server scores the storylines using entity scores. After block 324, the method 300 continues to either block 310, as described above, or to block 326. At block 326, the server extracts geographic locations, themes, and times from top scoring storylines. At block 328, the server generates events with the top themes, geographic locations, and times. At block 330, rules are applied by the server to categorize the storylines at block 332. At block 334, the storylines are ranked against events. After block 334, the method 300 ends.

Events are generated by combining themes with the spatial and temporal entities identified in storylines. Algorithm 2 (in the Algorithm Appendix) shows how generating events based on themes, location and time entities is performed in-memory with the location, time and theme entities extracted from entities RDD and then combined together to create events. The task of finding the combinations of location, time and entities based on one or more subject depends on the technique used for subject creation or labeled data based entity extraction. These are crucial to identifying events and associating entities with events. Operation 2 categorizes storylines into events. This approach tests keywords in a storyline against the spatial, temporal and theme entities and assigns it to the theme based events using rules specified by user. The rules provided by user to categorize storylines into events with theme, location and time elements and their application on storylines is explained below.

Categorization Rules format The rules are of following format:

theme ([and|or] location [and|or] time)

Hence the rules can take any of the following forms:

1. theme or (location and time)
2. theme or location
3. location
4. time

The rules specify which entities in a storyline need to match with rule entity of particular type in order to associate a storyline to the event. Hence, Rule 1 specifies that only if storyline entities match either theme or location and time then categorize the storyline to the event. Rule 2 can categorize a storyline to the event if any of its entities matches either theme or location of the event, while Rule 4 associates any storyline whose entities match the temporal entity of the event.

As each of these rules are applied to a storyline for each event, if any rule is satisfied for a storyline against an event, the storyline is categorized under that event. Algorithm 3 (in the Algorithm Appendix) categorizes storylines under events applying the rules. Rules are broadcast to all the nodes and the storylines RDD then has each storyline in it run through the rules and associated with an event if any rule matches the storyline to the event. As soon as a storyline is associated with an event the rules application ends. Based on number of entities in a storyline that match rule's theme, location or time, a weight is assigned to storylines. For classifier events the weights are normalized with the storylines classifier score.

In some aspects of the subject technology, prospects are generated from storylines. Prospects are generated by extracting key people and organization from data elements used to build storylines. Algorithm 4 (in the Algorithm Appendix) shows how generating prospects from social posts of storylines entities is performed in-memory with the social posts from entities RDD. The task of finding top scoring storylines utilizes the weights from topic modeling and features selection and the storylines scores against SVM classifiers as shown in Operation 2. These are then utilized to generate social posts from top storyline entities and extract top people and organizations as prospects in Operation 3.

Figure 4:
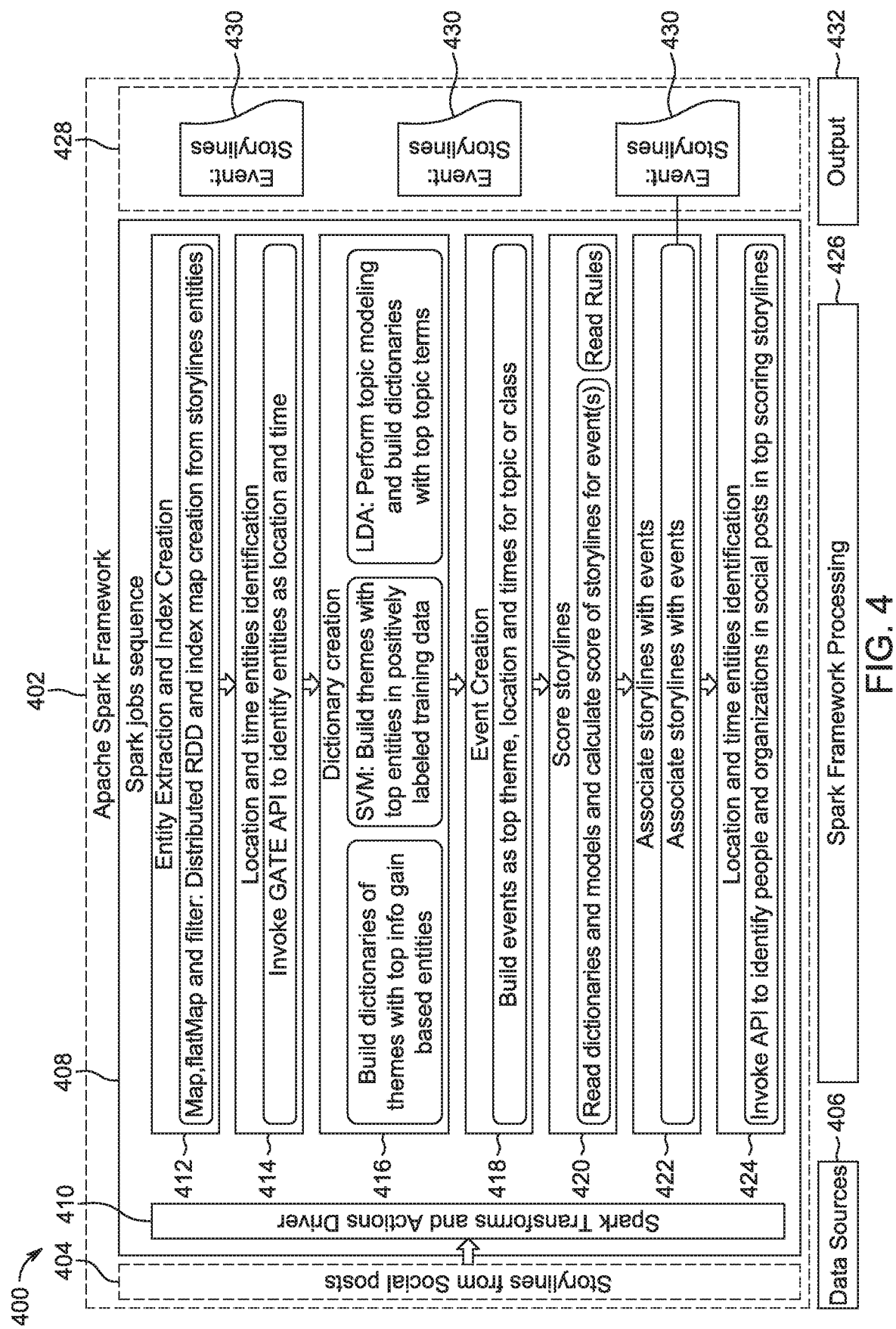
FIG. 4 illustrates an example distributed in-memory spatio-temporal storyline categorization platform architecture, according to some embodiments.

Example architectures for the subject technology are described below. One example system architecture of the platform to generate events in storylines is shown in FIG. 4. Due to large number of storylines generated from social posts collected on topics, the amount of data to be processed to generate events on the entities can be large. Event creation is performed as an extension to the platform described in U.S. patent application Ser. No. 15/092,020, filed on Apr. 6, 2016, and titled "DISTRIBUTED STORYTELLING FRAMEWORK FOR INTELLIGENCE ANALYSIS," which is incorporated herein by reference in its entirety. In-memory distribution may be used for computing topics and performing feature selection based on information gain, as these techniques may be highly iterative and might not scale well on disk based distribution paradigms such as MapReduce as disk I/O will be highly detrimental to performance. Some modules described herein generate themes from storylines, identify location and time entities and combine them to create composite events.

One Spark module processes storylines by reading the storylines in parallel and extracting entities from the storylines. Vectors are built with indices of entities in storylines.

One module determines spatial (e.g., geographic location) and temporal terms. This module determines the spatial and temporal terms using an application programming interface (API). Each storyline is broken down into entities in parallel and, in each process, APIs are initiated and used to label entities in the storyline document. The entities identified in processing step are used to create an index of entity strings to integers that is then used on storyline vectors in subsequent step.

One module builds themes and theme dictionary terms. vectors built in processing step for each storyline are passed to one of the three theme generation routines—topic modeling based, entity selection based, and classification based.

In the topic modeling based theme generation routine, the vectors are passed to the an LDA based topic modeling module. This module returns the entities for the topics and their corresponding weights for the topic. These are then saved as dictionary for the theme.

If the specified theme building process is entity selection based on information gain, the vectors are passed into the information gain based entity selection routine based on Maximum Relevancy Minimum Redundancy. This technique performs information gain in parallel to generate a list of top k entities for the labeled training set. This list is saved as the dictionary for the theme event on which the labels in training data are based.

For chosen theme building process classification, the labeled data for storylines is used to build an SVM model using the SVM Spark routine that build the model in parallel. This model is then used to score the storylines and top k positively labeled storylines entities are chosen and added to the dictionary.

FIG. 4 illustrates an example distributed in-memory spatio-temporal storyline categorization platform architecture 400, according to some embodiments. As shown, the architecture 400 includes an Apache Spark framework 402, which represents data sources 406, Spark framework processing 426, and output 432.

The Apache Spark framework 402 has storylines 404 from social posts as the data sources 406, a Spark job sequence 408, as the Spark framework processing 426, and an output block 428 as the output 432. As shown in FIG. 4, the storylines 404 are provided to the Spark job sequence 408 while the Spark transform and actions driver 410 of the Spark job sequence 408.

In the Spark job sequence 408, the entity extraction and index creation module 412 uses map, flatMap, and filter for distributed RDD and index map creation from storyline entities. The location and time entities identification module 414 invokes API to identify entities as location and time. The dictionary creation module 416 builds dictionaries of themes with top information gain based entities, uses SVM to build themes with top entities in positively labeled training data, and uses LDA to perform topic modeling and build dictionaries with top topic terms. The event creation module 418 builds events as top theme, location, and time for topic or class. The score storylines module 420 reads dictionaries and models and calculate scores of storylines for events and reads rules. The associate storylines with events module 422 associates storylines with events. The location and time entities identification module 424 invokes an API to identify people and organizations in social posts in top scoring storylines. The output of module 422 is provided to the output block 428, which stores multiple event: storylines associations 430 of an event with one or more storylines.

The modules described above assign storylines to generated events in a scalable manner. The module 422 scores each storyline and determines which event the storyline will be assigned to based on user specified rules, as discussed in conjunction with FIG. 3, blocks 330 and 332. The event creation module 418 generates events as a combination of themes and spatiotemporal entities. In the case of topic modeling an event is generated for each topic with the top theme entity of the topic, top location entity and top time entity by weight combined to generate the spatio-temporal event. In the case of feature selection top weighing theme, location and time entity with highest information gain value are combined to generate the event that corresponds to class of labeled data. In the case of the classifier, the most frequent theme, location and time in positively labeled training data is combined to generate event.

Storylines are tested by loading theme, location and time dictionaries in cache. This is used to test storylines in parallel to identify storylines that fall within the event. Rules provided by the user are broadcast to all nodes and processed and information in the rules is used to determine how to assign storyline to event. Storylines are categorized into events in one process. This process categorizes and lists in parallel events and the storylines within them. Events are a combination of theme, location, and time in the example format—theme: location: time.

A prospect identification technique identifies top storylines and computes the social posts associated with the entities in those storylines. It then applies named entity recognition using an API on the text of the social posts to generate the top people and organizations. Storylines are scored in each of the techniques using the weight of entities in topic, the score assigned to storyline by classifier and the weight associated with entities in feature selection.

Top storylines are generated from SVM scores in case of classification, entity weight in topic in topic modeling and feature weight in feature selection. In the case of topic modeling a storyline is associated with a score that is the sum of the entity weights for each topic. In the case of feature selection storyline is given a score which is the sum of the score of the entities of storyline. In the case of the classifier, the storyline is scored against SVM model and is assigned a score.

The technique of collecting social posts associated with storylines generates a list of social posts associated with each entity of a storyline. The technique of extracting named entities from social posts as people and organizations generates a list of people and organizations that are in the list of social posts associated with top scoring storylines by technique and lists them by frequency.

Figure 5:
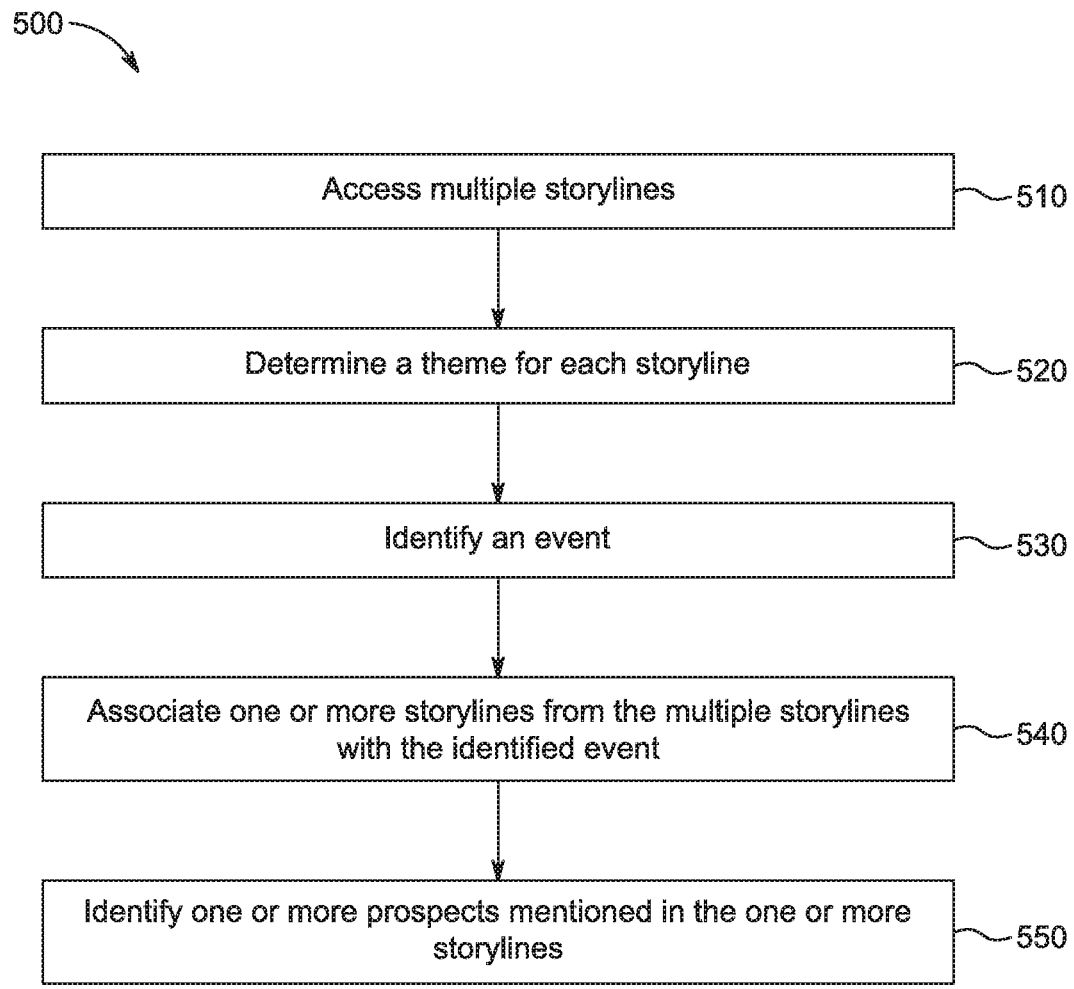
FIG. 5 is a flow chart of an example method for event categorization and key prospect identification from storylines, according to some embodiments.

FIG. 5 is a flow chart of an example method 500 for event categorization and key prospect identification from storylines, according to some embodiments.

At operation 510, a server accesses multiple storylines. Each storyline has a time and a geographic location. For example, the storylines may be derived from publicly accessible social posts (e.g., Tweets®) in a social networking service (e.g., Twitter®), as described herein.

At operation 520, the server determines a theme for each storyline. The determined theme for each storyline includes a topic for the storyline or a tag for the storyline that is different from the time and different from the geographic location. In some cases, the theme is determined based on top-weighted keywords in a text of the storyline. In some cases, the theme is determined using a theme classifier module trained via machine learning. The theme classifier module may be a SVM. The theme classier module may implement LDA topic modeling. The theme classifier module may perform feature selection based on information gain and may score storylines, for association with a given theme, by adding information gain weights for text from the storyline.

At operation 530, the server identifies an event using one or more of an event time, an event geographic location, and an event theme. In some cases, the server identifies multiple events.

At operation 540, the server associates one or more storylines from the multiple storylines with the identified event based on a correspondence between the time, geographic location or theme of the one or more storylines and the event time, the event geographic location or the event theme. In some cases, the one or more storylines from the multiple storylines are associated with the identified event based on one or more user-provided rules.

At operation 550, the server identifies one or more prospects that are mentioned at least a threshold number (e.g., 10 or 100) of times in the one or more storylines associated with the identified event. The one or more prospects are one or more persons or one or more organizations. In some cases, the one or more prospects are mentioned in at least a second threshold number (e.g., 5 or 50) of storylines from the one or more storylines associated with the event. After operation 550 the method 500 ends.

Multiple different use cases of the subject technology are possible. For example, storylines may be extracted from public posts (Tweets®) in the social network Twitter® from the Twitter® streaming API in June 2015. Events may be generated, for example, which are related to the commodity oil and the currency Euro.

The topic modeling technique uses LDA and produces topics with top keywords and weights added to topic's dictionary. After experiment with several topic numbers, a subject expert decided on three as optimal number of topics from which to generate events. That number was within the constraints of not subdividing an event into subevents and yet generate meaningful results. Feature Selection based on Information gain generates a dictionary of themes with highest information gain. The features selection routine is given a set of labeled observations based on a specified class. The training data set is generated by a subject matter expert. For the oil dataset a training set was built for storylines related to oil prices and for the Euro dataset the training data was for the proposed Greek exit from the Eurozone. The classifier based themes dictionary creation uses labeled data provided by subject matter expert. It uses the training set to build a classifier. The most frequent features are used as dictionary and top theme, location and time terms are used to create the event. Storylines with score higher than a threshold as classified by model and entities satisfying the categorization rules are associated with the event. Storylines in each event are assigned by testing the entities against event's location, time and theme entities. The rule used to categorize storylines into events in our experiments is "location or time or theme."

Oil events relate to social posts (e.g., Tweets®) related to the commodity oil. The filtering keywords for tweets extracted are 'oil, wti, brent, crude, frack, fracking, oil price, petroleum, petro, west texas intermediate, oil inventory, oil production, oil refinery, #crudeoil and nymex'. The entry points for storylines are 'oil' and 'petroleum.'

Applying topic modeling produces the topics shown in Table 1. The top entities for each topic are similar, two 'amp' and 'petroleum' being top entities in each of the 3 topics and the third ranked entities being number 24, gas and canvas indicating one of the topics is more related to painting oil. Applying information gain based feature selection generates the top terms shown in Table 1. These weights more accurately reflect oil related storylines as expected of a supervised technique as the top information gain weight terms are not only related to oil but also to the price of oil which was the basis of labeled data. Top features by classifier are in Table 1. These features accurately reflect the key entities in training dataset specifically the ones most frequent in positively labeled elements. Top storylines based on events from top feature selection entities are in Table 2. Top storylines by weight for each topic from topic modeling as generated by application of rules are in Table 2. Top storylines based on events from classifier based top themes, locations and time entities are in Table 2. These categorizations clearly show that storylines in same set get categorized differently under different events simply due to application of different entity ranking techniques.

The analysis of oil brought mixed results, which is potentially explained by the broad range of topics covered by the term oil. For example, oil is associated with petroleum, body oil, oil paintings and other categories unrelated to the area of focus. Thus, the topics and associated storylines identified by topic modeling shown in Table 1 and Table 2 hold limited relevance and add little to the understanding of oil prices. The results from topic modeling were also clouded by the entity 'amp' which actually refers to the character '&' and was erroneously picked up as an entity. However, the information gain and classification models did reveal interesting topics and storylines. First, the international crude oil price of Indian Basket as computed by the Ministry of Petroleum and Natural Gas of the Republic of India was $61.53 per barrel on Jun. 16, 2015, an informative metric given India is one of the largest importers of petroleum in the world and the Indian government heavily subsidizes those imports. Second, the entity 'weather fueling oil price discovery' alluded to the foul weather moving through Texas at that time which was expected to impact oil production and thus prices.

TABLE 1

Oil topic modeling, information gain based feature selection and classifier labeled data based top entity weights

| topic1 | weight | topic2 | weight | topic3 | weight |
|---|---|---|---|---|---|
| amp | 0.033 | amp | 0.32 | amp | 0.0334 |
| petroleum | 0.023 | petroleum | 0.0266 | petroleum | 0.023 |
| 24 | 0.0150 | gas | 0.0129 | canvas | 0.011 |
| feature | info gain | feature | info gain | feature | info gain |
| us $61.53 | 0.0335 | weather fueling oil price discovery | 0.0267 | global crude oil price | 0.0294 |
| singapore | 0.006 | oil prices | 0.0288 | 17-Jun | 0.0091 |
| feature | weight | feature | weight | feature | weight |
| petroleum | 333 | us $61.53 | 58 | oil price | 77 |
| london | 44 | reuters | 61 | 17-Jun | 15 |

TABLE 2

Oil top storylines by LDA, information gain and classifier weight

| topic event | storyline | LDA weight |
|---|---|---|
| amp:north america:1988 | oil:london #jobs:amp:sales manager | 0.0422 |
| amp:north america:1988 | oil:amp:deals:funnel | 0.0400 |
| petroleum:london:17-Jun | oil:london #jobs:amp:sales manager | 0.0422 |
| petroleum:london:17-Jun | amp:seed oil unrefined 100:deals | 0.0401 |
| gas:greece:today | oil:amp:engine oil:gas | 0.0480 |
| gas:greece:today | oil:grease:paper 10 sets face care:amp | 0.0470 |

| topic event | storyline | info gain weight |
|---|---|---|
| us $61.53:singapore:17-Jun | oil:petroleum:us $61.53:global crude oil price | 0.0629 |

TABLE 2-continued

Oil top storylines by LDA, information gain and classifier weight

| | | |
|---|---|---|
| us $61.53:singapore:17-Jun | oil:petroleum:us $61.53:weather fueling oil price discovery | 0.0602 |
| us $61.53:singapore:17-Jun | oil:reuters:oil prices production | 0.0513 |

| topic event | storyline | classifier weight |
|---|---|---|
| petroleum:london:17-Jun | oil:long:iran:petroleum | 1.2209 |
| petroleum:london:17-Jun | oil:petroleum:oil price:our 2015 global #oil | 1.1375 |
| petroleum:london:17-Jun | oil:brent oil forecast. current price:petroleum:global crude oil price | 1.1114 |

Euro events include social posts (e.g., Tweets®) regarding the change in value and status of the currency euro. Filtering keywords 'Euro, Euro exchange rate, euro rates, euro-dollar, dollar euro, euro crisis, euro conversion, euro rate, eur and eur usd' are specified for social post collection. The entry point for storylines is 'euro'. On Euro related storylines, the use case applied event generation techniques. Applying topic modeling generates the topics shown in Table 3. Three topics were provided to the LDA method. The top entities were similar for the three topics with the difference being in third highest weighted entity indicating topics being related to emergency summit over the Greek exit (from the Eurozone) crisis. The top features by classifier are shown in Table 3. These features are more accurately related to the Greek exit due to the application of training data on the subject provided. Applying information gain based feature selection produces the top terms shown in Table 3. These entities are also highly relevant due to use of training data. Top storylines by weight for each topic as generated by application of rules are in Table 4. Top storylines based on events from top feature selection entities are given in Table 4. Top storylines based on events from classifier based top themes, locations and time entities are provided in Table 4. These storylines clearly show the preponderance of storylines on Greek exit crisis from the Euro at the time and the Federal Open Market Committee meeting on Jun. 18, 2015.

On the analysis of the Euro dataset, topic modeling, information gain, and classification all highlighted the crisis occurring in Greece's economy and the potential of a Greek Exit from the Euro. Topic modeling even highlighted the emergency summit taking place in Luxembourg to discuss the situation. In this case, the information gain based feature selection analysis generated the most noise as the highest weighted features included indiscernible numbers and entities related to sports even though two of the features were 'geek exit' and 'syriza hard-liners back.' The number of storylines an analyst has to review is greatly reduced for events, for SVM the number of storylines is reduced to 933 from over 300,000 when threshold of 1.0 is set for the SVM scores.

TABLE 3

Euro top entities by information gain feature selection, topic modeling and classifier weights

| topic1 | weight | topic2 | weight | topic3 | weight |
|---|---|---|---|---|---|
| the euro | 0.0136 | the euro | 0.0137 | the euro | 0.0139 |
| eur | 0.012 | eur | 0.0123 | eur | 0.0121 |
| luxemborg | 0.0055 | emergency summit | 0.0064 | 2015 | 0.008 |

| feature | info gain | feature | info gain | feature | info gain |
|---|---|---|---|---|---|
| greek exit | 0.0621 | | 0.049 | | 0.03 | 0.0461 |
| 18 June | 0.0282 | | 0.08 | | 0.0473 | syriza hardliners back | 0.0228 |
| #football | | | | | |
| #soccer | | | | | |
| #sports | | | | | |

| feature | weight | feature | weight | feature | weight |
|---|---|---|---|---|---|
| greek exit | 194 | yesterday's fomc meeting | 91 | 72.43 | 108 |
| 2015 | 24 | 1199.9 | 97 | greece | 83 |

TABLE 4

Euro top storylines by event and topic modeling, information gain and classifier weights

| topic event | storyline | LDA weight |
|---|---|---|
| the euro:2015:luxemborg | euro:zone ecofin meetings:the euro:eur | 0.03106 |
| the euro:2015:luxemborg | euro:dibebani yunani:eur:the euro | 0.02900 |
| eur:19-Jun:greece | euro:zone ecofin meetings:the euro:eur | 0.0309 |
| eur:19-Jun:greece | euro:dibebani yunani:eur:the euro | 0.0288 |
| amp:this day:edinburg | euro:zone ecofin meetings:the euro:1.7:0 | 0.0207 |
| amp:this day:edinburg | euro:lows:6:eur | 0.0215 |

| topic event | storyline | info gain weight |
|---|---|---|
| greek exit:greece:18 June | euro:2:0.08:#dollar | 0.0068 |
| greek exit:greece:18 June | euro:gold:0.13:0.08 | 0.029 |
| greek exit:greece:18 June | oil:gas temp:marks sattin:#cash #applications accountant | 0.29 |

| topic event | storyline | classifier weight |
|---|---|---|
| greek exit:greece:2015 | euro:yesterday's fomc meeting:greek exit:support | 1.3681 |
| greek exit:greece:2015 | euro:yesterday's fomc meeting:greek exit:Greece #euro | 1.3410 |
| greek exit:greece:2015 | euro:central bank:greeks themselves:greece | 1.2701 |

Identifying key prospect use cases are described below. The subject technology, in some aspects, provides users with the ability to track investment and target prospects by identifying emerging people and organizations in open data. Further, the subject technology, in some aspects, narrows down the number of prospects down to the ones identified in the storylines with highest scores based on the models built to identify them. Two sets of storylines built on data from the social network Twitter® extracted using keywords filtering using the Twitter® streaming API in July 2016 were used.

The autonomous car investment use case identifies top people and organizations with the highest impact in domains of connected car and autonomous driving. Filtering keywords 'Autonomous vehicle, Mobile Car Sharing, Telematics, driverless vehicle, . . . , driver-assistance systems' are specified for tweet collection. The entry points for storylines are 'connected car, driverless car.'

On connected car related storylines the subject technology applied the three supervised and unsupervised techniques the subject technology had earlier used in event generation. Applying topic modeling generates the topics and entity weights as shown in Table 5 and corresponding storyline weights shown in Table 6. Three topics were provided to the LDA method. The top storylines by classifier weight are shown in Table 6. Applying information gain based feature selection produces the top entities in Table 5 and top storylines shown in Table 6. These entities are also highly relevant due to use of training data. Top storylines by weight for each topic as generated by application of rules are in Table 6. Top named entities in data elements for top storylines are shown in Table 7.

Results of the connected car analyses proved useful in terms of understanding the key connected car events of the day as well as identifying the individuals and organizations related to those events. Each algorithm produced different, yet complementary results that provided the analyst with a broad picture of the different themes emanating from the day's social post data. For instance, topic modeling highlighted LG's new partnership with Volkswagen to develop technology to allow drivers to monitor and control devices in the home from their car as well as improve in-vehicle entertainment capabilities. Topic modeling also highlighted the newly developed car with the YunOS operating system jointly developed by China's Alibaba's and SAIC Motors. The information gain algorithm produced different results that emphasized Jaguar Land Rover's new venture in the area car sharing through their wholly owned subsidiary InMotion and Nokia Growth Partner's new internet-of-things investment fund, which invests in connected car companies. The classification results partially overlapped with the topic modeling results, as both identified Alibaba's activities. And classification added additional value by also highlighting updates to Google's self-driving car initiative, which was not captured in top storylines from topic modeling. Ultimately, the list of storylines identified by the three algorithms was distilled to a list of persons and organizations found within the data underlying those storylines (Table 7). While some organizations were mischaracterized as persons, including ZF Friedrichshafen (a German auto-parts manufacturer) and BABA (the ticker symbol for Alibaba), the algorithm did an adequate job of identifying relevant and interesting entities. Tesla and Google's efforts in connected car are well known, but LG's initiatives were certainly less publicized. The individuals identified included connected car expert Lee Colman, Head of Connected Car at SBD Automotive (a UK based consultancy). Mr. Colman was also a frequent speaker at various conferences including CarCon-Expo Dusseldorf 2016 and Telematics Berlin 2016 and is, perhaps, an expert worth following. Other individuals included Ethan Lou and Jake Spring, both Reuters reporters who cover the car industry.

TABLE 5

Connected car top entities by information gain feature selection, topic modeling and classifier frequency weights

| topic1 | weight | topic2 | weight | topic3 | weight |
|---|---|---|---|---|---|
| connected car | 0.1659 | connected car | 0.1626 | connected car | 0.1586 |
| driverless car | 0.0883 | driverless car | 0.0863 | driverless car | 0.0900 |
| navigation | 0.0597 | chicago | 0.0542 | navigation | 0.0628 |

| feature | info gain | feature | info gain | feature | info gain |
|---|---|---|---|---|---|
| 1 | 0.0827 | car | 0.0327 | venture-capital | 0.0106 |
| wingz | 0.005 | chicago | 0.0071 | 0 | 0.0120 |

| feature | frequency | feature | frequency | feature | frequency |
|---|---|---|---|---|---|
| china | 194 | alibaba | 91 | volkswagen | 108 |
| internet | 180 | reuters | 97 | safety | 83 |

TABLE 6

Connected car top storylines by topic modeling, information gain and classifier weights

| storyline | LDA weight | topic |
|---|---|---|
| connected car:automotive:car platform:technews | 0.2017 | topic1 |
| connected car:lg:technology:the road | 0.2010 | topic1 |
| connected car:china:economy:new post | 0.2021 | topic2 |
| connected car:alibaba's internet:car:new post | 0.2020 | topic2 |
| connected car:jobs:northbrook:systems design | 0.2022 | topic 3 |
| connected car:alibaba's internet:car:the world | 0.2019 | topic 3 |

| storyline | info gain weight |
|---|---|
| connected car:car:nokia growth partners:unquotenews | 0.1162 |
| connected car:car:jaguar land rover's new tech subsidiary inmotion:smartcommuter | 0.1051 |
| connected car:china:navigation:the navyo smart glove | 0.0870 |

| storyline | classifier weight |
|---|---|
| connected car:alibaba's internet:car:connected | 0.1167 |
| connected car:automotive:programs:mapping | 0.1154 |
| connected car:automotive:the google self:mapping | 0.1145 |

TABLE 7

Connected car top named entities by information gain feature selection, topic modeling and classifier weights

| Organization | topic frequency | Person | topic frequency |
|---|---|---|---|
| LG | 40 | Z F Friedrichshafen | 1 |
| VW | 9 | Lee Coleman | 1 |
| Ford | 2 | ena | 1 |

| Organization | info gain frequency | Person | info gain frequency |
|---|---|---|---|
| LG | 68 | aren | 3 |
| Volkswagen | 42 | ena | 1 |
| Reuters | 20 | BABA | 1 |

TABLE 7-continued

Connected car top named entities by information gain feature selection, topic modeling and classifier weights

| Organization | classifier frequency | Person | classifier frequency |
|---|---|---|---|
| LG | 40 | Ethan Lou | 1 |
| Reuters | 20 | Lee Colman | 1 |
| Tesla | 4 | aren | 1 |
| Google | 4 | Jake Spring | 1 |

Another use case is directed to augmented reality/virtual reality prospects. This use case identifies top people and organizations that are having the highest impact in nascent augmented and virtual reality domains. Filtering keywords 'virtual reality, augmented reality, . . . , yr bandwidth, ar bandwidth, yr optimization, ar optimization, amazon vr, amazon ar' are specified for tweet collection. The entry points for storylines are 'vr, ar, virtual reality.'

On augmented reality related storylines, the use case applied the three supervised and unsupervised techniques described above in event generation. Applying topic modeling generates the topics shown in Table 8. Three topics were provided to the LDA method. The top entities were similar for the three topics with the difference being in third highest weighted entity. The top features by classifier are shown in Table 8. Applying information gain based feature selection produces the top terms shown in Table 8. These entities are also highly relevant due to use of training data. Top storylines by weight for each topic as generated by application of rules are in Table 9. Top storylines based on events from top feature selection entities are given in Table 9. Top storylines based on events from classifier based top themes, locations and time entities are provided in Table 9. Top named entities in the data elements for top storylines are shown in Table 10.

Besides well known companies in Table 10, the bulk of named entity list comprises of new companies such as 'Unimersiv-VR Education', 'Lunar Flight CV' and 'opTic' that are of specific interest to investors. The utility of the virtual reality and augmented reality results were more mixed compared to the connected car results. Themes resulting from topic modeling varied from Lenovo's use of Google's Tango augmented reality technology in their new smartphones to robbers using the mobile game Pokemon Go to find and lure unsuspecting victims, and the impending launch of Samsung Gear VR 2, Samsung's latest virtual reality headset. Storylines identified thru information gain and classification included publicity for mobile Monday Detroit, an event showcasing AR and VR demos, Mark Zuckerberg's announcement of Open Cellular which is tangentially related to the topic of virtual reality, and news around the development of Sony's Playstation VR gaming platform. The organizations identified by the algorithms included some of the biggest names in virtual reality such as Google, HTC, Sony, and Samsung as well as other organizations less known for their efforts including Nintendo and Microsoft. Nintendo was making a huge splash in the market with its wildly successful Pokemon Go augmented reality mobile game and this analysis perhaps acted as an early indicator of how successful the game would eventually become. Meanwhile, Microsoft was making news for using virtual reality for autistic kids in their preparation for jobs. The identified persons included Phil (Phil Spencer) the Xbox chief at Microsoft, David (David Joyner) of Georgia Tech who publishes a blog summarizing news and events in the area of virtual reality, and Kevin Durant, professional basketball player, who was making headlines as the Golden State Warriors used virtual reality to recruit Durant. As was the case with connected car, some of the identified names were actually organizations or other entity types. One such example was Unity, a game development platform used by leading game developers. Overall, the algorithms effectively managed to refine a large volume of raw data (over 140,000 virtual reality related tweets and nearly 40,000 connected car related tweets) to a much more manageable and targeted dataset for the analyst to examine and further research. Aspects of the subject technology may be used to track the results of multiple days' worth of data to see what results would emerge.

TABLE 7

Connected car top named entities by information gain feature selection, topic modeling and classifier weights

| Organization | topic frequency | Person | topic frequency |
|---|---|---|---|
| LG | 40 | Z F Friedrichshafen | 1 |
| VW | 9 | Lee Coleman | 1 |
| Ford | 2 | ena | 1 |

| Organization | info gain frequency | Person | info gain frequency |
|---|---|---|---|
| LG | 68 | aren | 3 |
| Volkswagen | 42 | ena | 1 |
| Reuters | 20 | BABA | 1 |

| Organization | classifier frequency | Person | classifier frequency |
|---|---|---|---|
| LG | 40 | Ethan Lou | 1 |
| Reuters | 20 | Lee Colman | 1 |
| Tesla | 4 | aren | 1 |
| Google | 4 | Jake Spring | 1 |

TABLE 8

Augmented reality top entities by information gain feature selection, topic modeling and classifier weights

| topic1 | weight | topic2 | weight | topic3 | weight |
|---|---|---|---|---|---|
| virtual reality | 0.0901 | virtual reality | 0.1307 | vr | 0.1281 |
| the future | 0.0264 | the future | 0.0901 | virtual reality | 0.0912 |
| the magic leap | 0.0260 | startup | 0.0260 | startup | 0.0297 |

| feature | info gain | feature | info gain | feature | info gain |
|---|---|---|---|---|---|
| virtual reality | 0.0215 | 0 | 0.1083 | 1 | 0.0549 |
| 2016 | 0.005 | vr | 0.0207 | our blog | 0.0110 |

| feature | frequency | feature | frequency | feature | frequency |
|---|---|---|---|---|---|
| games | 58 | oculus | 61 | news | 18 |
| reality | 175 | headset | 99 | pokemon | 24 |

TABLE 9

Augmented reality top storylines by event and topic modeling, information gain and classifier weights

| storyline | LDA weight | topic |
|---|---|---|
| vr:cool:front:i recalibrate the oculus sensor | 0.2031 | topic1 |
| vr:cool:la france:metheniyacine | 0.2023 | topic1 |
| vr:google:reality #technology:tango:vr | 0.2044 | topic2 |
| vr:htc vive:people:robbers | 0.2038 | topic2 |
| vr:amazing:oculus:verder gaan | 0.2021 | topic 3 |
| virtual reality:samsung:tech:three companies | 0.2020 | topic 3 |

| storyline | info gain weight |
|---|---|
| vr:eyes:zuckerberg:so boring | 0.1462 |
| vr:the australian public's attitude:exploring:yuri librarian it's cool | 0.1462 |
| vr:atari cofounder nolan bushnell:startups:virtual reality | 0.1103 |

| storyline | classifier weight |
|---|---|
| vr:la france:le grand cran:vive | 2.0841 |
| vr:1:11:us a mobile monday detroit | 1.9923 |
| vr:1:2016:titres playstation vr annoncés | 1.980 |

TABLE 10

Augmented reality top named entities by information gain feature selection, topic modeling and classifier weights

| Organization | topic frequency | Person | topic frequency |
|---|---|---|---|
| HTC Vive | 40 | VR | 46 |
| Sony | 12 | Unity | 10 |
| Microsoft | 13 | David | 4 |

| Organization | info gain frequency | Person | info gain frequency |
|---|---|---|---|
| HTC Vive | 28 | des | 9 |
| Sony | 12 | phil | 6 |
| Microsoft | 9 | lucas | 7 |

| Organization | classifier frequency | Person | classifier frequency |
|---|---|---|---|
| HTC Vive | 47 | VR Shell | 25 |
| Google | 45 | Kevin Durant | 7 |
| Samsung | 35 | vida | 7 |
| Nintendo | 9 | una | 9 |

Figure 6:
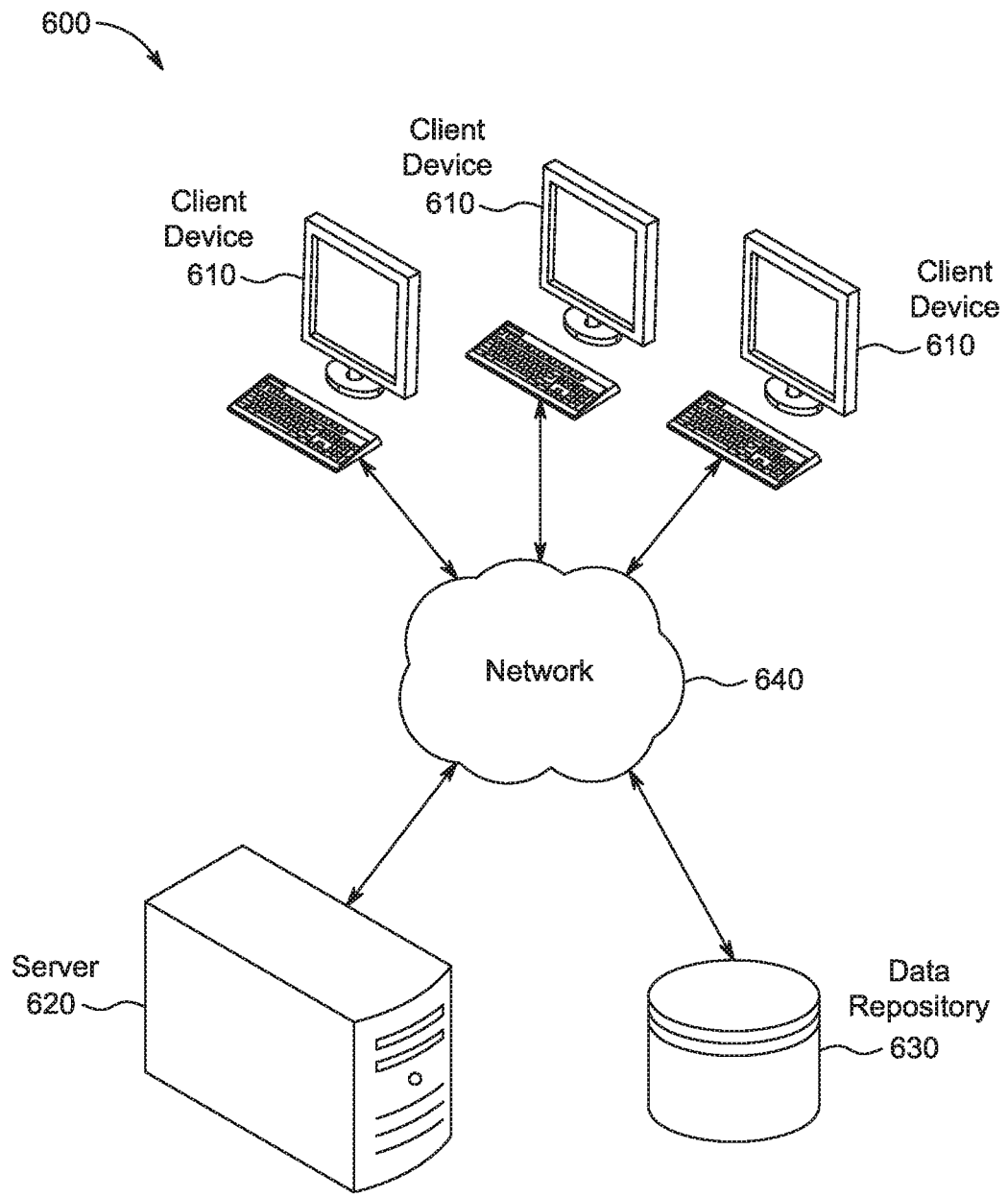
FIG. 6 is a block diagram of an example system in which a distributed in-memory spatio-temporal storyline categorization platform may be implemented, according to some embodiments.

FIG. 6 is a block diagram of an example system 600 in which a distributed in-memory spatio-temporal storyline categorization platform may be implemented, according to some embodiments. As shown, the system 600 includes client devices 610, a server 620, and a data repository 630 configured to communicate with one another via a network 140. A machine may be configured to carry out functions by having software code stored in its memory, by having the instructions hard-wired into the hardware of its processor(s), or by a combination of software and hardware. The network 640 may include one or more of the Internet, an intranet, a local area network, a wide area network (WAN), a cellular network, a WiFi network, a virtual private network (VPN), a public network, a wired network, a wireless network, etc.

The client device(s) 610 may include one or more of a laptop computer, a desktop computer, a mobile phone, a tablet computer, a personal digital assistant (PDA), a digital music player, etc. The client device(s) 610 may include an application (or multiple applications), such as a web browser or a special purpose application, for communicating with the server 620 and the data repository 630. Using the application, a user of the client device(s) 610 may add a social post to a social networking service or to a microblog. Using the application, the user of the client device(s) 610 may request an output corresponding to any of the event: storyline associations generated by the server 620 using the techniques described herein.

The server 620 stores data or instructions. The server 620 is configured to carry out the functions described herein in conjunction with FIGS. 1-5. Specifically, the server 620 is configured to carry out the method 300 of FIG. 3 or the method 500 of FIG. 5. The server 620 may include the distributed in-memory spatio-temporal storyline categorization platform architecture 400 of FIG. 4.

The data repository 630 stores content associated with a social networking service or a microblog, such as posts, which may include text and may be associated with a geographic location. The data repository 630 also stores events, storylines, and event: storyline associations generated by the server 620. The data repository 630 may be implemented as a database or any other data storage unit.

In the implementation of FIG. 6, the system 600 includes a single data repository 630 and a single server 620. However, the subject technology may be implemented with multiple data repositories 630 or multiple servers 620. Furthermore, as shown in FIG. 6, a single network 640 connects the client device(s) 610, the server 620, and the data repository 630. However, the subject technology may be implemented using multiple networks 640 to connect the machines. Additionally, while the server 620 and the data repository 630 are illustrated as being distinct machines, in some examples, a single machine functions as both the server 620 and the data repository 630. In one example, the server 620 and the data repository 630 communicate via a communication link that is not part of the network 640, and the data repository 630 is not connected to the network. Furthermore, FIG. 6 illustrates three client devices 610. However, the system 600 may include any number of client devices 610 connected to the network 640. In some cases, the system 600 may include thousands or millions of client devices 610.

Figure 7:
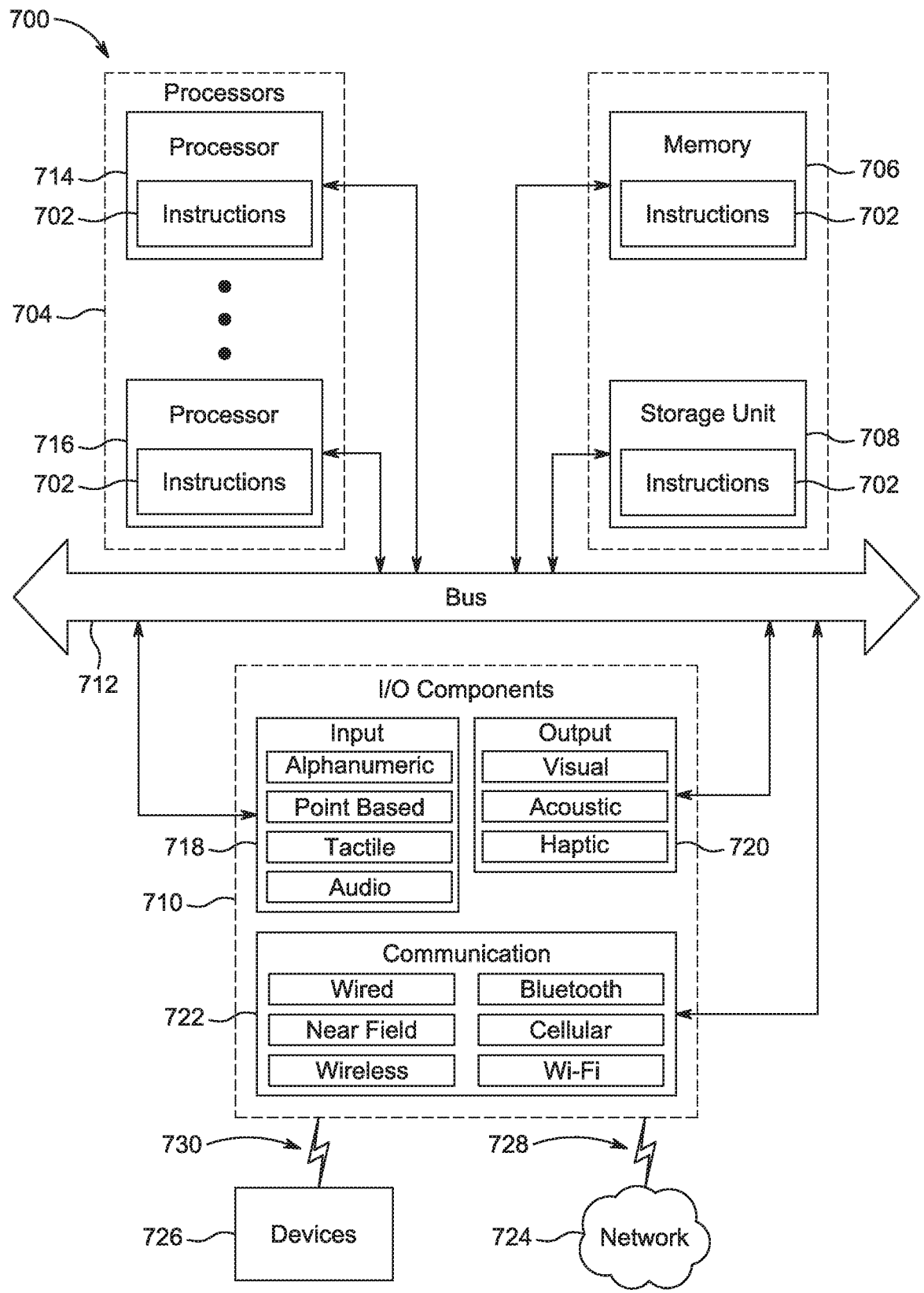
FIG. 7 is a block diagram illustrating components of a machine able to read instructions from a machine-readable medium, according to some embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a system, within which instructions 702 (e.g., software, a program, an application, an applet, an app, a driver, or other executable code) for causing the machine 700 to perform any one or more of the methodologies discussed herein may be executed. For example, the instructions 702 include executable code that causes the machine 700 to execute the methods 300 or 500. In this way, these instructions transform the general, non-programmed machine into a particular machine programmed to carry out the described and illustrated functions in the manner described herein. The machine 700 may operate as a standalone device or may be coupled (e.g., networked) to other machines. The machine 700 may correspond to the client device 610, the server 620, or the data repository 630.

By way of non-limiting example, the machine 700 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 702, sequentially or otherwise, that specify actions to be taken by machine 700. Further, while only a single machine 700 is illustrated, the term "machine" shall also be taken to include a collection of machines 700 that individually or jointly execute the instructions 702 to perform any one or more of the methodologies discussed herein.

The machine 700 may include processors 704, memory 706, storage unit 708 and I/O components 710, which may be configured to communicate with each other such as via a bus 712. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 714 and processor 716 that may execute instructions 702. The term "processor" is intended to include multi-core processors that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core process), multiple processors with a single core, multiple processors with multiples cores, or any combination thereof.

The memory 706 (e.g., a main memory or other memory storage) and the storage unit 708 are both accessible to the processors 704 such as via the bus 712. The memory 706 and the storage unit 708 store the instructions 702 embodying any one or more of the methodologies or functions described herein. In some embodiments, the database 76 resides on the storage unit 708. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of processors 704 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine 700 (e.g., processors 704), cause the machine 700 to perform any one or more of the methodologies described herein (e.g., method 500 and/or the operations performed by the modules discussed in FIG. 4). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine will depend on the type of machine. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various example embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via coupling 728 and coupling 730, respectively. For example, the communication components 722 may include a network interface component or other suitable device to interface with the network 724. In further examples, communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

ALGORITHM APPENDIX

---

ALGORITHM 1: GENERATE THEMES

---

Input: {storyline$_i$},{labeled$_j$} {unlabeled storylines and labeled storylines for supervised learning}
Output: {event$_k$, storyline$_i$ under each event$_k$}
  {each event definition and storylines under each event}
1: {step 1: parse storylines and extract entities to generate labeled and unlabeled RDDs}
2: Create trainingDataRDD from labeled storylines file on distributed file system using map transform
3: Create entityIndexRDD as index of entities to integers using flatMap and filter transforms
4: Create testingDataRDD from unlabeled storylines file on distributed file system using map transform
5: Create labeledVectorsRDD and unlabeledVectorsRDD with vectors for storylines using zipwithindex and distinct transforms
6: {step2: Identify location and time entities}
7: Extract location and time entities from all entities and build locationTimeRDD using flatMapToPair transform
8: as PairRDD as map of entities and their type location or time
9: {step3: run LDA model and get topics or SVM Modeling or Info Gain Feature Selection}
10: if technique is topic modeling then
11:   IdaModel = new LDA( ).setK(noOfTopics).run(storylineEntityVectorsRDD);
12: else if technique is feature selection based on information gain then
13:   Create FeatureSelection featureSelection object
14:   PerformMRMRfeature selection by featureSelection.minimumRedundancyMaximumRelevancy(storylineEntityVectorsRDD, numberOfFeatures);
15:   extract information gain values by featureSelection.relevancyRedundacyValues( );
16: else if technique is classifier based then
17:   {call svm classification routine}
18:   Build SVMModel by invoking SVMWithSGD.train(labelPointsRDD, numIterations)
19:   score testingDataRDD with model
20:   Extract themes as PairRDD;String,Integer<,from positively scoring data
21: end if

---

ALGORITHM 2: GENERATE EVENTS

---

Input: {storyline$_i$},{labeled$_j$} {storylines and labeled storylines for supervised learning}
Output: {event$_k$}
  {each event definition and storylines under each event}
1: {step 1: Use themes and dictionaries generated in previous algorithm}
2: Get locTimeRDD from previous step
3: Get labeled VectorsRDD from previous step
4: {step 2: Use output from applied algorithm from previous step}
5: if technique used is topic modeling then
6:   {Applying top LDA weighted themes, locations and times}
7:   for all topic ∈ Topics do
8:     Extract top location, time and theme term along with their weights
9:     Combine top weighted theme, time and location entity into event
10:  end for
11:  Get k events where k were number of topics extracted
12: else if technique is feature selection based on information gain then
13:   {Generate events with top info gain entities}
14:   Generate event as combination of top information gain theme, location and time
15: else if technique is classifier based then
16:   {Generate events with top positively labeled storylines location, time and theme entities by frequency}

---

ALGORITHM 2: GENERATE EVENTS

---

17:   Calculate frequency of entities in positively labeled documents
18:   Combine top location, time and theme entities into events
19: end if

---

ALGORITHM 3: CATEGORIZE STORYLINES UNDER EVENTS

---

Input: {storyline$_i$},{event$_j$},svmModel {storylines and labeled storylines for supervised learning}
Output: {event$_k$,storyline$_i$ under each event$_k$}
  {each event definition and storylines under each event}
1: {step 1: parse rules}
2: Broadcast rules to all worker nodes
3: Read rules in broadcast var
4: {step 2: Apply rules to generate events depending on algorithm previously applied}
5: if technique used is topic modeling then
6:   {Categorize storylines under topic events}
7:   for all topic ∈ Topics do
8:     PairRDD<Integer, Storyline>topicToStoryLinesRDD using mapToPair transform by applying rules and
       dictionaries by topic to storylines
9:   end for
10: else if technique used is feature selection then
11:   {Categorize storylines under feature selection events}
12:   Build RDD fsStoryLinesRDD using map transform by applying rules and events to storylines
13: else if technique is svm then
14:   {Categorize storylines under svm events}
15:   Build RDD classifierStoryLinesRDD using map and filter transforms
    by applying rules and scored storylineVector- RDD against model
16:   if score ≥ threshold and match rules then
17:     assign storyline to event
18:   end if
19: end if

---

ALGORITHM 4: GENERATE PROSPECTS

---

Input: {storyline$_i$},{labeled$_j$} {storylines and labeled storylines for supervised learning}
Output: {prospect$_k$}
  {top scoring storylines against model in supervised learning or in unsupervised learning and the data elements they were built from}
1: {step 1: Use dictionaries generated in previous algorithm}
2: Get labeled VectorsRDD from previous step
3: {step 2: Use output from applied algorithm from previous step to score storylines}
4: if technique used is topic modeling then
5:   {match entity in each topic with storylines entity}
6:   for all topic ∈ Topics do
7:     {Generate top scoring storylines by topic based on topic weights of entities}
8:     Score storylines entities against topic entity and sum weights of entities in topic
9:     Build list of top K storylines by topic
10:  end for
11: else if technique is feature selection based on information gain then
12:   {Generate top scoring storylines with top info gain entities}
13:   score each storyline as a combination of its entities info gain weight
14: else if technique is classifier based then
15:   {Generate top scoring positively labeled storylines}
16:   Get entities of top scoring storylines against classifier
17: end if
18: {step 3: Generate list of tweets from entities of top storylines and get most frequent people and organization from tweets}

-continued

ALGORITHM 4: GENERATE PROSPECTS

19: Lookup tweets associated with the top M storyline entities
20: PairRDD <String, Integer>as count of people and organizations from tweets of top storyline entities

What is claimed is:

1. A method comprising:
accessing, by a server computer system via a network, a plurality of storylines from one or more social networking systems, each storyline having a time and a geographic location;
determining, using one or more computing machines of the server computer system, themes in the plurality of storylines;
identifying, using the one or more computing machines of the server computer system, a plurality of events comprising an event, each of the plurality of events having an event time, an event geographic location, and an event theme;
generating, using the one or more computing machines of the server computer system, an event category score for each of the plurality of storylines based on performing machine learning model analysis of correspondences between the time, the geographic location, and the themes associated with each of the plurality of storylines and the event time, the event geographic location, and the event theme of each of the plurality of events, wherein performing the machine learning model analysis is distributed among in-memory computing resources of the one or more computing machines and comprises:
generating a plurality of event category scores by a plurality of different machine learning models each trained to score a correspondence between storyline time, storyline geographic location, and storyline theme with event time, event geographic location, and event theme for a corresponding event category, and
categorizing each storyline into an event, including categorizing one or more storylines into an event category associated with the identified event through machine learning, when event category scoring satisfies a categorization threshold associated with each of the one or more events including the identified event;
identifying, using the one or more computing machines of the server computer system, one or more prospects that are mentioned with a highest frequency in social media posts from which storylines categorized into the identified event are constructed, the one or more identified prospects being relevant to the identified event, and the one or more prospects being one or more persons or one or more organizations; and
providing, as a digital transmission via the network, an output representing the one or more identified prospects.

2. The method of claim 1, wherein the plurality of storylines are derived from publicly accessible posts in a social networking service.

3. The method of claim 1, wherein the themes determined from the plurality of storylines comprises a topic of a storyline or a tag for the storyline that is different from the time and different from the geographic location.

4. The method of claim 1, wherein determining the themes from the storylines comprises determining themes based on top-weighted keywords in text of the storylines.

5. The method of claim 1, wherein determining the themes from the storylines comprises using a theme generator trained via machine learning.

6. The method of claim 5, wherein the theme generator comprises a supervised machine learning model.

7. The method of claim 5, wherein the theme generator comprises an unsupervised machine learning topic modeling model.

8. The method of claim 5, wherein the theme generator performs feature selection based on information gain and scores storylines, for association with a given theme, by adding information gain weights for text from the storyline.

9. The method of claim 1, wherein associating the one or more storylines from the plurality of storylines with the identified event is further based on one or more user-provided rules.

10. A non-transitory machine-readable medium storing instruction which, when executed by one or more computing machines of a server computer system, cause the one or more computing machines to implement operations comprising:
accessing, by a server computer system via a network, a plurality of storylines from one or more social networking systems, each storyline having a time and a geographic location;
determining, using one or more computing machines of the server computer, themes in the plurality of storylines;
identifying, using the one or more computing machines of the server computer, a plurality of events comprising an event, each of the plurality of events having an event time, an event geographic location, and an event theme;
generating, using the one or more computing machines of the server computer system, an event category score for each of the plurality of storylines based on performing machine learning model analysis of correspondences between the time, the geographic location, and the themes associated with each of the plurality of storylines and the event time, the event geographic location, and the event theme of each of the plurality of events, wherein performing the machine learning model analysis is distributed among in-memory computing resources of the one or more computing machines and comprises:
generating a plurality of event category scores by a plurality of different machine learning models each trained to score a correspondence between storyline time, storyline geographic location, and storyline theme with event time, event geographic location, and event theme for a corresponding event category, and
categorizing each storyline into an event, including categorizing one or more storylines into an event category associated with the identified event through machine learning, when event category scoring satisfies a categorization threshold associated with each of the one or more events including the identified event;
identifying, using the one or more computing machines of the server computer, one or more prospects that are mentioned with a highest frequency in social media posts from which storylines categorized into the identified event are constructed, the one or more identified prospects being relevant to the identified event, and the one or more prospects being one or more persons or one or more organizations; and providing, as a digital transmission via the network, an output representing the one or more identified prospects.

11. The machine-readable medium of claim 10, wherein the plurality of storylines are derived from publicly accessible posts in a social networking service.

12. The machine-readable medium of claim 10, wherein the themes determined from the plurality of storylines comprises a topic of a storyline or a tag for the storyline that is different from the time and different from the geographic location.

13. The machine-readable medium of claim 10, wherein determining the themes from the storylines comprises determining themes based on top-weighted keywords in text of the storylines.

14. The machine-readable medium of claim 10, wherein determining the themes from the storylines comprises using a theme generator trained via machine learning.

15. Machine-readable medium of claim 14, wherein the theme generator comprises a supervised machine learning model.

16. The machine-readable medium of claim 14, wherein the theme generator comprises an unsupervised machine learning topic modeling model.

17. The machine-readable medium of claim 14, further comprising a storyline association generator that performs feature selection based on information gain and scores storylines, for association with a given theme, by adding information gain weights for text from the storyline.

18. A server computer system, comprising:
processing hardware of one or more computing machines;
a memory storing instruction which, when executed by the processing hardware, cause the one or more computing machines to implement operations comprising:
accessing, via a network, a plurality of storylines from one or more social networking systems, each storyline having a time and a geographic location;
determining themes in the plurality of storylines;
identifying a plurality of events comprising an event, each of the plurality of events having an event time, an event geographic location, and an event theme;
generating an event category score for each of the plurality of storylines based on performing machine learning model analysis of correspondences between the time, the geographic location, and the themes associated with each of the plurality of storylines and the event time, the event geographic location, and the event theme of each of the plurality of events, wherein performing the machine learning model analysis is distributed among in-memory computing resources of the one or more computing machines and comprises:
generating a plurality of event category scores by a plurality of different machine learning models each trained to score a correspondence between storyline time, storyline geographic location, and storyline theme with event time, event geographic location, and event theme for a corresponding event category, and
categorizing each storyline into an event, including categorizing one or more storylines into an event category associated with the identified event through machine learning, when event category scoring satisfies a categorization threshold associated with each of the one or more events including the identified event;
identifying one or more prospects that are mentioned with a highest frequency in social media posts from which storylines categorized into the identified event are constructed, the one or more identified prospects being relevant to the identified event, and the one or more prospects being one or more persons or one or more organizations; and
providing, as a digital transmission via the network, an output representing the one or more identified prospects.

* * * * *